(12) United States Patent
White

(10) Patent No.: US 6,236,174 B1
(45) Date of Patent: May 22, 2001

(54) METHOD AND APPARATUS FOR DRIVING A POLYPHASE, BRUSHLESS DC MOTOR

(75) Inventor: Bertram J. White, Irvine, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/300,754

(22) Filed: Apr. 26, 1999

Related U.S. Application Data

(60) Provisional application No. 60/083,156, filed on Apr. 27, 1998.

(51) Int. Cl.[7] .................................................. H02K 23/00
(52) U.S. Cl. ........................... 318/254; 318/138; 318/439; 318/606; 318/798; 318/812; 318/811
(58) Field of Search ..................................... 318/254, 138, 318/439, 606, 798, 812, 811; 324/61, 163, 107

(56) References Cited

U.S. PATENT DOCUMENTS

| | | | |
|---|---|---|---|
| 4,006,399 | * 2/1977 | Studtmann | 322/47 |
| 4,104,611 | * 8/1978 | Kalden | 324/163 |
| 4,881,025 | * 11/1989 | Gregory | 324/163 |
| 5,260,650 | * 11/1993 | Schwesig et al. | 324/163 |
| 5,283,519 | * 2/1994 | Patzig | 324/207.19 |
| 5,378,979 | * 1/1995 | Lombardi | 324/107 |

* cited by examiner

Primary Examiner—Karen Masih
(74) Attorney, Agent, or Firm—W. Daniel Swayze, Jr.; Wade James Brady, III; Frederick J. Telecky, Jr.

(57) ABSTRACT

A method and circuit are presented for operating a polyphase dc motor in which substantially sinusoidal drive voltages are applied to the windings of the motor in predetermined phases. Zero crossings of currents flowing in respective windings of the motor are detected, and phases of the drive voltages are adjusted to have zero crossings substantially simultaneously with the detected zero crossings of the currents flowing in respective windings of the motor. The method and circuit results in motor operation with significantly reduced acoustic motor noise.

16 Claims, 3 Drawing Sheets

METHOD AND APPARATUS FOR DRIVING A POLYPHASE, BRUSHLESS DC MOTOR

This application is a continuation of application Ser. No. 60/083,156 filed Apr. 27, 1998.

BACKGROUND OF THE INVENTION

1. Field of of the Ivention

This invention relates to improvements in methods and circuits for driving DC brushless, Hall-less, polyphase motors, such as a spindle motor of a hard disk drive, or the like, and more particularly to improvements in such driving methods and circuits that at least reduce the acoustic noise in motors of this type using driving voltages having substantially sinusoidal waveforms.

2. Relevant Background

Efficient motor drive requires that the excitation current in the three motor phases be aligned with the bemf generated by the three phases. One of the best schemes for achieving this alignment is the use of a phase-locked loop (PLL). The phase-locked loop adjusts the phase and frequency of the commutation so the bemf of the un-driven windings passes through zero in the center of the appropriate commutation state. This scheme works well when the shape of the commutation waveforms includes an un-driven region, as in a conventional 6-state, +1, +1, 0, −1, −1, 0, sequence.

Since the +1, +1, 0, −1, −1, 0 sequence has sharp transitions between driving states, this sequence has many high frequency components. These tend to excite mechanical resonances in the motor, which results in the creation of undesirable acoustic noise. Moreover, the step-function tristating of the undriven motor phases, together with the step-function driving waveform produces a degree of torque ripple in the motor. The torque ripple results in an unevenness or jerkiness in the motor rotation, which also excites resonances in the motor, also causing undesirable acoustic noise.

Thus, if it is desired to reduce acoustic noise, a sine wave shaped excitation signal is more appropriate than the 6-state sequence. If the motor driver consists of sinusoidal current sources, the same voltage sensing PLL described above can be used. However, when the duty cycle of the driver is varied sinusoidally, the motor driver excitation is pulse-width modulated (PWM) to minimize power dissipation in the driver IC. This permits lower cost packaging and an overall saving in system cost.

In sine wave excited systems, in the past, in order to estimate the position of the motor, the drive voltage was caused to lead the current by a predetermined amount to compensate for the inductance in the motor windings. Thus, the goal was to achieve a zero crossing of the current simultaneously with the zero crossing of the bemf. It was, however, observed that the actual phase lead is proportional to the magnitude of the current that results from the particular drive voltage that is applied. However, it is difficult to generate currents that have a pure sinusoidal waveform, particularly when the currents are relatively high, and also when a PWM scheme is desired to be used.

To address this difficulty, a small sense resistor was inserted into each drive current leg, and a current sensing loop was used to adjust the duty cycle of the drive voltage. The sense resistors were generally externally supplied by the customer, and their value had to be critically determined. Such precision resistors are relatively expensive, and their effective resistance values were difficult to determine.

In the case of sinusoidal PWM drive, the windings of the motor are alternately connected to the positive and negative supplies. Thus, the winding voltages contain no information about bemf voltage, and a voltage sensing phase detector will not work.

There has been recent emphasis on disk drive manufacturers to reduce the noise associated with disk drive motors. Consequently, what is needed is a disk drive and method for operating it in which the noise associated with the drive in operation is reduced or eliminated. What is additionally needed is a disk drive and method that employs sinusoidal drive signals, or the like, that does not require external sense resistors to determine an estimate of the drive current applied to the motor windings.

SUMMARY OF THE INVENTION

In light of the above, therefore, it is an object of the invention to provide an improved disk drive and method for operating it in which the noise associated with the drive in operation is reduced or eliminated.

It is another object of the invention to provide a circuit and method for determining or estimating the bemf in the motor windings, without requiring a tri-stated drive signal in a system that uses sinusoidal signals, or the like.

It is still another object of the invention to provide a disk drive and method that employs multiple sinusoidal drive signals, or the like, that does not require external sense resistors to determine an estimate of the drive current applied to the motor windings.

These and other objects, features and advantages of the invention will be apparent to those skilled in the art from the following detailed description of the invention, when read in conjunction with the accompanying drawings and appended claims.

The essence of the invention is the use of the sign of the motor current as the input to the commutation phase lock loop. The current polarity thus is used to determine the bemf of the motor. Thus, the phase of the driving voltage can be adjusted so that the voltage and current have simultaneous zero crossings in a motor that uses sinusoidally shaped drive signals, or the like, and thereby reduce the acoustic noise that is generated by the motor in its operation.

Thus, in accordance with a broad aspect of the invention, a method is presented for operating a polyphase dc motor in which substantially sinusoidal drive voltages are applied to the windings of the motor in predetermined phases. Zero crossings of currents flowing in respective windings of the motor are detected, and phases of the drive voltages are adjusted to have zero crossings substantially simultaneously with the detected zero crossings of the currents flowing in respective windings of the motor.

According to another broad aspect of the invention, a circuit is provided for operating a polyphase dc motor. The circuit has driver circuits for providing driving signals to the motor and a source of substantially sinusoidal motor drive voltages for application to the driver circuits. A circuit is provided to detect zero crossings of current flowing in the driver circuits as a result of the sinusoidal motor drive voltages. A circuit changes the phase of the sinusoidal motor drive voltages with respect to the current flowing in the driver circuits to align zero crossings of the current flowing in the driver circuits with zero crossings of the sinusoidal motor drive voltages.

According to yet another broad aspect of the invention, a method is presented for reducing acoustic noise in operating a polyphase dc motor in which substantially sinusoidal drive voltages are applied to the windings of the motor in predetermined phases. Zero crossings of currents flowing in respective windings of the motor are detected, and phases of the drive voltages are adjusted to have zero crossings substantially simultaneously with the detected zero crossings of the currents flowing in respective windings of the motor.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENTS

Figure 1:
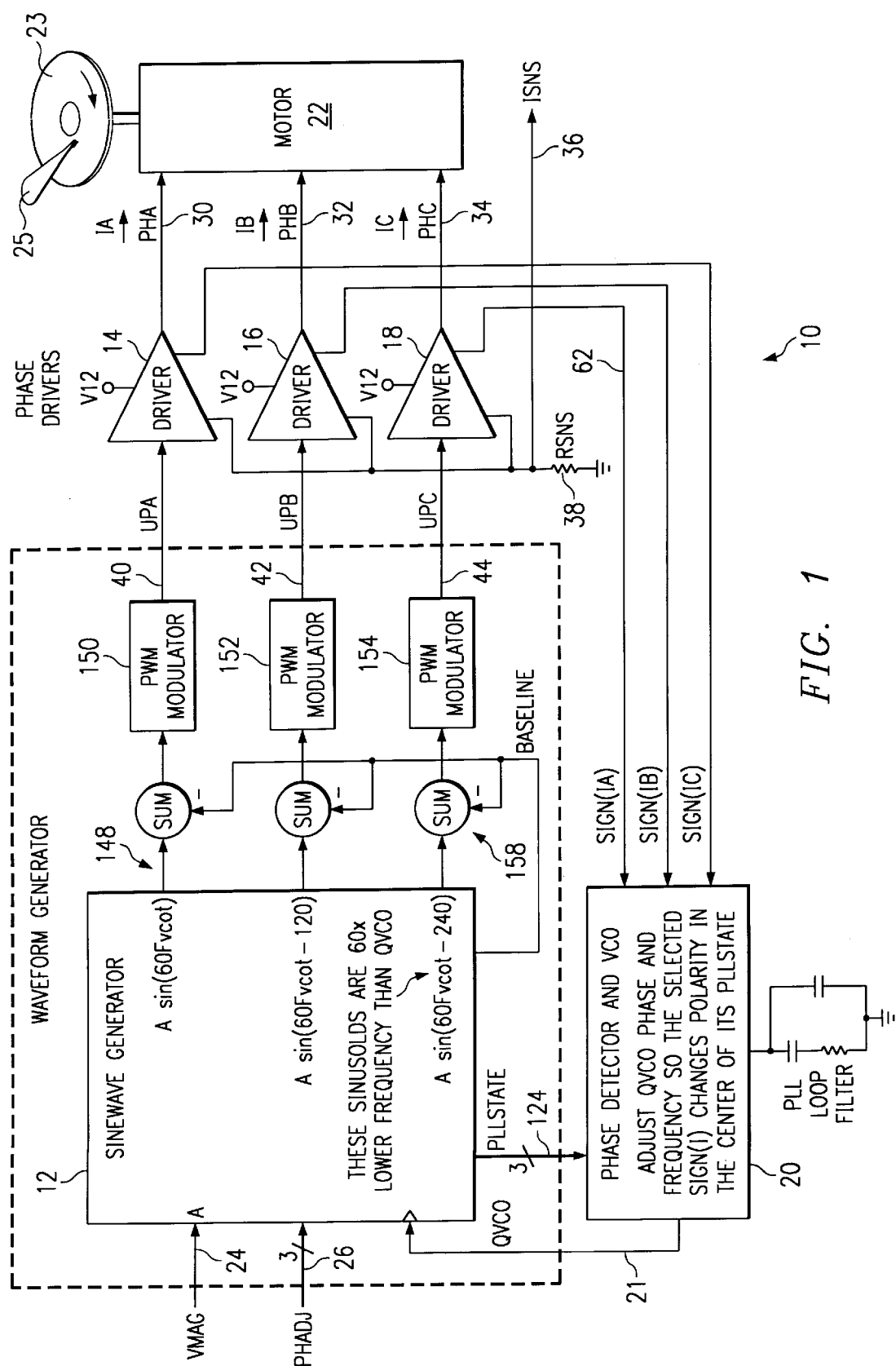
FIG. 1 is a block diagram of a motor driving circuit, according to a preferred embodiment of the invention.

FIG. 1 is a block diagram of a motor driver circuit 10, according to a preferred embodiment of the invention. The basic circuit consists of a waveform generator 12, three phase drivers 14, 16, and 18, and a phase-locked loop 20 to provide the required drive signals to the motor 22. The motor 22 is connected to turn a data media 23 having a read and/or write head 25 that is selectively positionable to read and/or write data to/from said media 23, in known manner. The media 23 may be, for example, a magnetic media of the type used in hard disk drive products, or may be an optical media, CD-ROM, DVD, or other such data media.

Inputs to the circuit are a voltage magnitude control signal, VMAG 24, and phase adjusting signals, PHADJ 26. VMAG controls the amplitude of the excitation, and can either be an analog input, as shown, or a digital input. PHADJ commands an adjustable DC phase lead between the excitation and the bemf. It also can be either analog or digital. The outputs PHA 30, PHB 32, and PHC 34 are the three connections to the windings of the motor 22. An optional output 36 called ISNS may be provided, which can be either analog or digital, to provide information about the instantaneous supply current derived at the sense resistor 38.

The Waveform Generator generates three digital outputs, UPA 40, UPB 42, and UPC 44, which are pulse-width modulated, as described below, to drive the phase drivers 14, 16, and 18. The duty cycle of these signals is such that the differential duty cycle between any two of the three outputs is sinusoidal. The amplitude of the sinusoids is proportional to the input magnitude control signal VMAG 24. The timing of the sinusoids is determined from the QVCO clock on line 21 from the PLL 20. In the implementation of FIG. 1, the sinusoids are 60× slower than QVCO.

Figure 2:
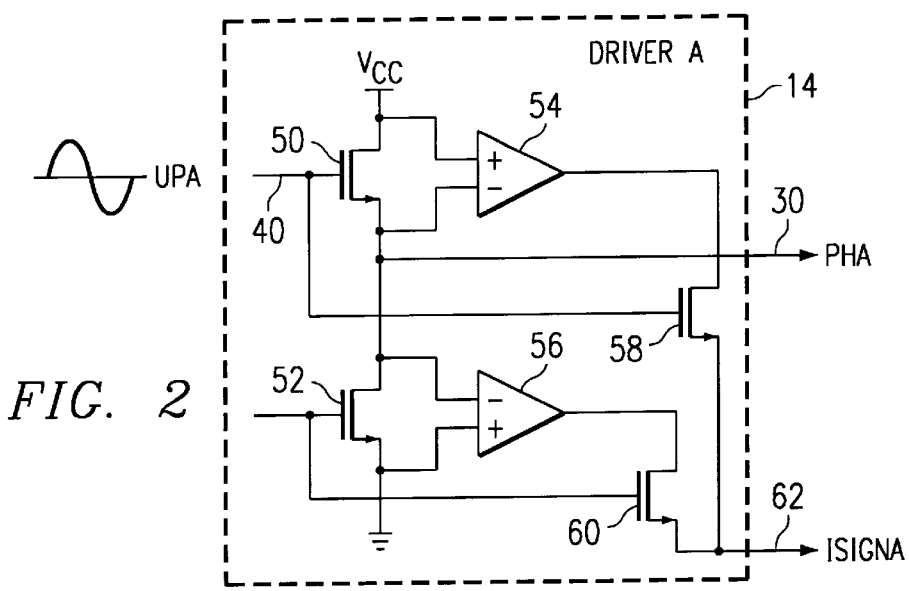
FIG. 2 is an electrical schematic diagram of a driver circuit, as used in the motor driving circuit of FIG. 1.

An electrical schematic diagram of one of the driver circuits, as used in the motor driving circuit of FIG. 1, is shown in FIG. 2. The phase Drivers are typically MOSFET switches that connect the phase winding to either Vcc or ground depending on the state of the UP input. They also generate a digital signal indicating the polarity of the winding current. The polarity of the current can be detected by looking at the Vds polarity of whichever MOSFET is on. Each of the driver 14, 16, and 18 may be similarly constructed with, for example, an upper drive FET 50 and lower drive FET 52, connected between Vcc and ground, with the drive output PHA 30 being derived at the junction therebetween, in an "H-bridge" manner, known in the art. The inputs to the FETS 50 and 52 are sinusoidal, or sinusoidal-like, shaped waveforms, at a frequency of, for example, 480 Hz (for a nominal 7500 rpm motor speed), PWMed at a frequency of, for instance, 30 kHz. In order to determine the zero crossings of the current a pair of comparators 54 and 56 are connected respectively across the drive FETs 50 and 52. Thus, the outputs of the comparators 54 and 56 change states when the current crosses zero to flow into or out of the driver circuit 14.

Figure 3:
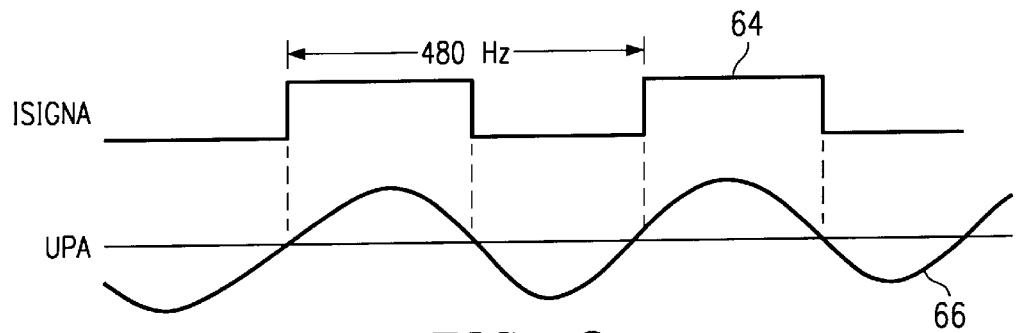
FIG. 3 shows waveforms of the multiplexed signal representing the sign of the current in a drive path for determining the zero crossing thereof, and its relationship with a sinusoidal drive voltage and its zero crossings.

The outputs of the comparators are multiplexed by FETs 58 and 60 onto output line ISIGNA 62, which is connected to the phase-locked loop, as below discussed. The multiplex selection between the outputs of comparators 54 and 56 is determined by the polarity of the input signals applied to the gates of the driver transistors 50 and 52. It is known, of course, that only one of the driver transistors 50 or 52 is on at any instant. Additionally, since during a commutation cycle, both transistors 50 and 52 will sequentially be turned on, with the current continuing to run in the same direction, into or our of the driver 14, the multiplexer transistors 58 and 60 are effective to deliver an output signal onto the line ISIGNA 62 with a waveform 64 as shown in FIG. 3, which represents the sign of the current in the driver 14. Thus, the zero crossing (and its direction) of the current in the driver aligns with the zero crossing of the sinusoidal drive voltage waveform 66. Since, as mentioned, the current does not suddenly shift directions upon the switching or commutation between the upper and lower driver transistors 50 and 52, some circuit simplification may be performed, for example, by combining the two comparators 54 and 56 into a single circuit (not shown), and so on.

Figure 4:
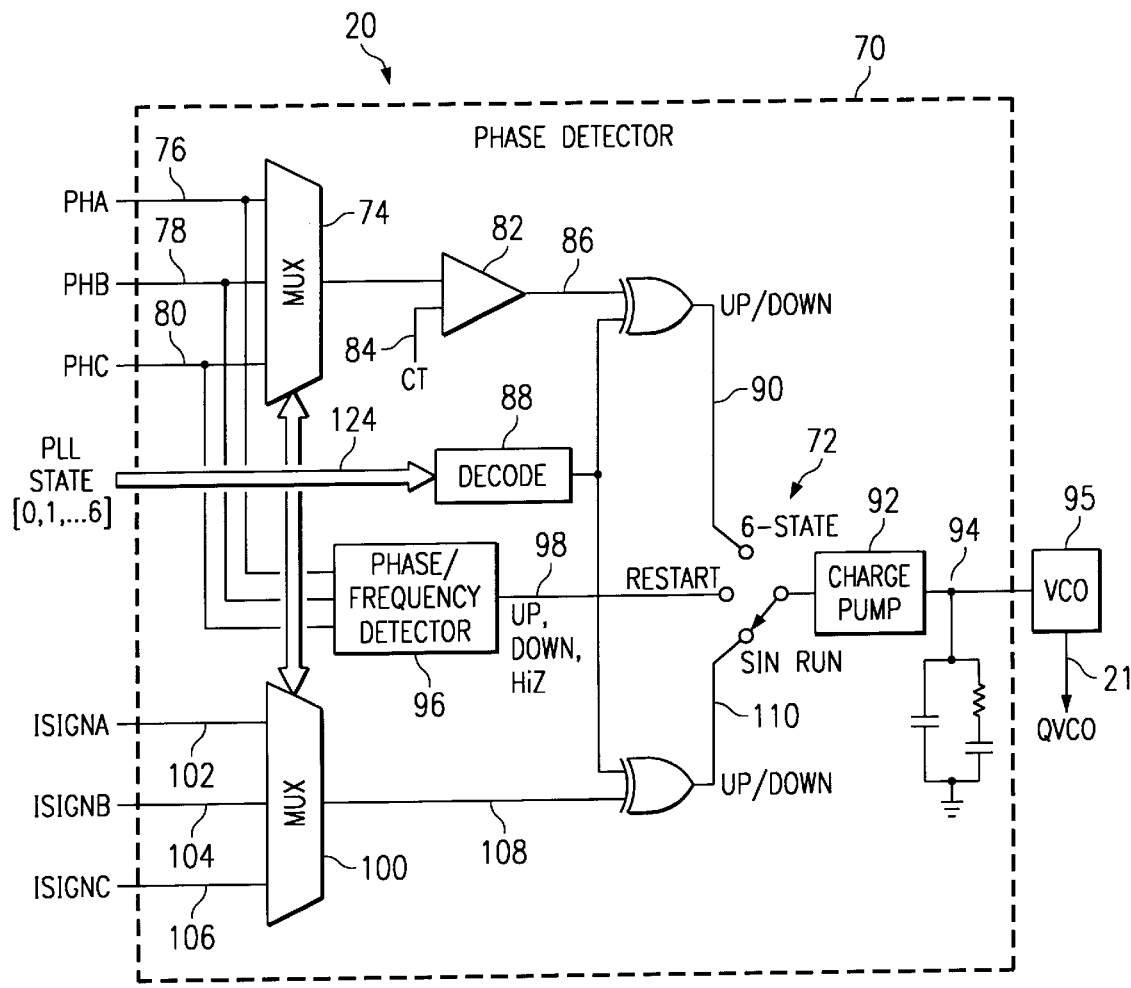
FIG. 4 is an electrical schematic diagram of a phase detector that may be used in the motor driving circuit of FIG. 1.

A block diagram of a phase detector 70 that may be used to detect the phase of and zero crossings of the drive current is shown in FIG. 4. The phase detector illustrated is provided with a restart mode, a normal 6-state operating mode, and a sine run operating mode (an operating mode that uses substantially sinusoidal driving voltage waveforms), as determined by the switch 72.

During motor start, for example, or if the motor voltage falls to a predetermined low lever, a 6-state mode may be used, since it is most robust, and since acoustic noise during startup is not of particularly great concern. The 6-phase operating mode is selected by the switch 72 to select the multiplexer 74, which receives phase A, phase B, and phase C input signals on lines 76, 79, and 80 respectively. The multiplexer 74 selects among the sinusoidal signals on the input lines to provide an input to a comparator 82, which compares the input signal to the center tap to produce a digital output signal on line 86. The output signal on line 86 is controlled by the state of the PLL, as determined by the decoder 88 to determine which phase is to be tristated. By selectively inverting the signal on line 86 by XORing the signal by the decoded PLL signal, an up/down signal is developed on line 90. The up/down signal is applied to a charge pump 92 to provide an output on line 94.

If desired, a restart mode may be provided, for example, by providing a phase/frequency detector 96, which also operates to develop up/down/tristate signals on line 98 for selective connection to the charge pump 92 and output line 94.

In the sine run mode, a multiplexer 100 receives the current sign signals, ISIGNA, ISIGNB, and ISIGNC signals, generated, for example, by the driver circuits, as illustrated in FIG. 2, on input lines 102, 104, and 106. The multiplexer 100 produces an output on line 108. Since the signals are already digital, a comparator like the comparator 82 described above is not needed. The signal on line 108 is XORed with the signal at the output of the decoder 88, representing the PLL state, to provide an up/down signal on line 110, when selected, to the charge pump 92.

Figure 5:
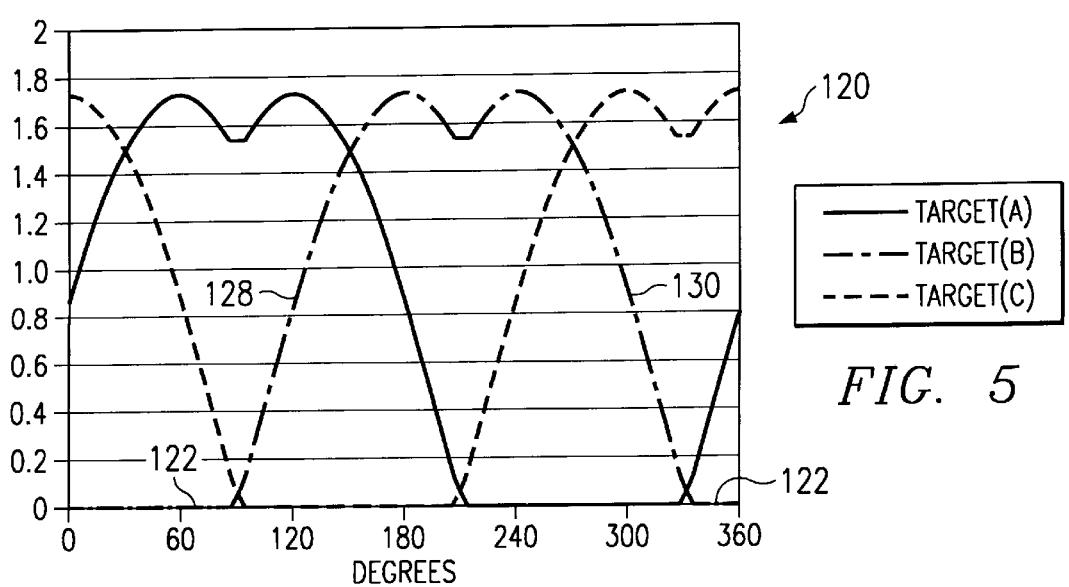
FIG. 5 is a series of waveforms that are generated by the waveform generator of FIG. 1, according to a preferred embodiment of the invention.

As mentioned, the output signals UPA, UPB, AND UPC applied to the motor 22 are substantially sinusoidal. These are generated by the waveform generator 12. It is, however, frequently desired to minimize the number of phases that are simultaneously modulated. Thus, it has been found that a portion of the waveform generated by the waveform generator 12 optionally may have a baseline waveform subtracted from each of the three sinusoidal waveforms. Since the same signal is subtracted from each signal, it has no effect on the voltage difference between sine waves. If the baseline signal is defined as the instantaneous minimum of the three sine waves, at any given time, one of the three resulting waveforms will be zero and not require modulation. This produces a set of sine wave modulating waveforms 120 as shown in FIG. 5, having a zero baseline 122. This reduces the number of simultaneously modulated phases to two. If desired, the baseline signal may be subtracted directly from the sinusoidal output signals by summer circuits 158, as shown in FIG. 1, or complete driving signals may be synthesized in the manner described below in detail.

With reference again briefly to FIG. 1, the waveform generator 12 produces outputs, PLLSTATE, on lines 124. PLLSTATE indicates in which of six 60° C. regions the commutation is, and is used to control the up/down count generated in the 6-state and sine run modes of the phase detector of FIG. 4. The phase of these regions is adjusted by PHADJ 26 to compensate for the phase difference between motor excitation voltage and bemf. The dominant source of this phase difference is the inductance of the motor windings. Based on PLLSTATE, the PLL selects the current polarity of the appropriate phase. It then adjusts the phase and frequency of QVCO until the polarity change of the selected phases is centered in their respective PLLSTATE.

Figure 6:
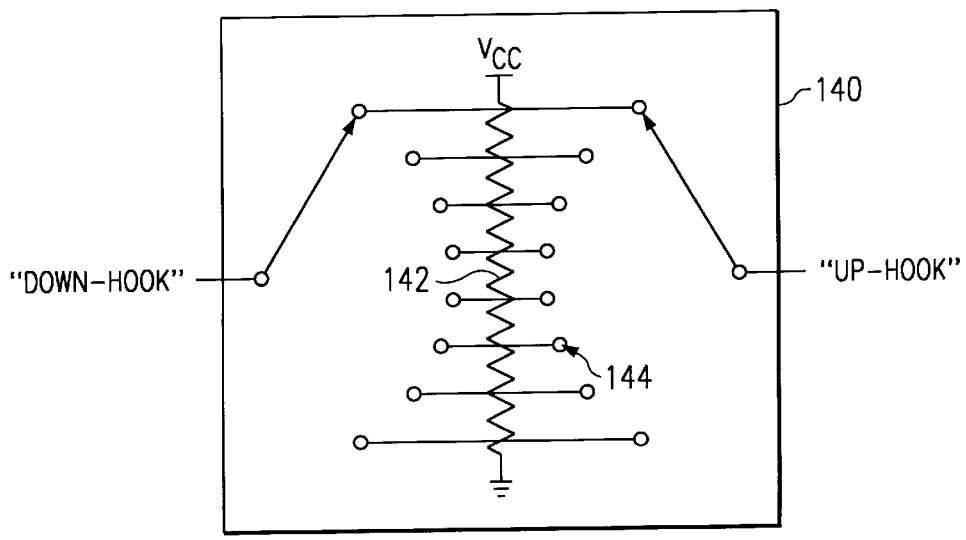
FIG. 6 is a diagram of a circuit for generating sinusoidal waveforms having a value of zero for 120° C., followed by a waveform having a shape of an "up hook" for 120° C., followed by a waveform having a shape of a "down hook" for 120° C., in accordance with a preferred embodiment of the invention.

With reference again to FIG. 5, each identical waveform can be defined as having 120° C. of zero 122, followed by 120° C. of "up hook" 128, followed by 120° C. of "down hook" 130. The term "hook" comes from each portion of the waveform's resemblance to a fish hook. In a preferred embodiment, the up and down "hook" waveforms can be generated using a MDAC 140, as shown in FIG. 6. The MDAC has a resistor 142 having a number of taps 144 that produce voltages that follow the up hook and down hook waveforms as they are sequentially selected. The output of the MDAC is provided on lines 148 (with reference once again to FIG. 1), and modulated by PWM modulators 150, 152, and 154 for delivery to the drivers 14, 16, and 18.

It should be appreciated that there are other ways for generating the sinusoidal signals herein described. For example, values can be read from a programmed memory and converted into analog signals. Other techniques will be apparent to those skilled in the art.

In operation, control of the speed of the motor may be accomplished by a DSP that can directly drive VMAG 24 through a DAC (not shown). Alternatively, a current control loop can be implemented which takes a current command from the DSP and adjusts VMAG 24 until the desired current is flowing in the motor. ISNS 36 may be used for the feedback.

Preferably, the waveform generator clock and the PWM clock have the same frequency during run mode. This minimizes any acoustic noise or torque ripple that may be created by low frequency beat frequencies between QVCO and the PWM rate. During startup, an independent, fixed frequency, PWM carrier may be used.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for operating a polyphase dc motor, comprising the steps of:

applying substantially sinusoidal drive voltages to drive the windings of the motor in predetermined phases;

detecting zero crossings of currents flowing in respective windings of the motor; and adjusting phases of the drive voltages to have zero crossings substantially simultaneously with the detected zero crossings of the currents flowing in respective windings of the motor.

2. The method of claim 1 further comprising pulse-width modulating the substantially sinusoidal motor drive voltages prior to application thereof to said driver circuits.

3. The method of claim 1 wherein said applying substantially sinusoidal drive drive voltages to the windings of drive the motor in predetermined phases comprises generating waveforms having a value of zero for 120° C., followed by a waveform having a shape of an "up hook" for 120° C., followed by a waveform having a shape of a "down hook" for 120° C., each waveform displaced from one another by 120° C.

4. The method of claim 3 wherein said generating a waveform connecting to successive taps on a resistor produce voltage values for forming said zero, "up hook", and "down hook" waveforms.

5. A circuit for operating a polyphase dc motor, comprising:

driver circuits for providing driving signals to drive the motor;

a source of substantially sinusoidal motor drive voltages for application to the driver circuits;

a circuit for detecting zero crossings of current flowing in the driver circuits as a result of the sinusoidal motor drive voltages;

a circuit to change the phase of the sinusoidal motor drive voltages with respect to the current flowing in the driver circuits to align zero crossings of the current flowing in the driver circuits with zero crossings of the sinusoidal motor drive voltages.

6. The circuit of claim 5 further wherein said driver circuits each comprise a pair of FETs connected together at a driving signal node and in series between a voltage supply and a reference potential, and wherein said circuit for detecting zero crossings of current flowing in the driver circuits as a result of the sinusoidal motor drive voltages comprises comparators connected across each of said FETs.

7. The circuit of claim 6 further comprising a multiplexer connected to receive outputs of said comparators, said multiplexer being actuated by said motor drive voltages to select one or another of said outputs of said comparators.

8. The circuit of claim 5 further comprising a circuit for pulse-width modulating the substantially sinusoidal motor drive voltages prior to application thereof to said driver circuits.

9. The circuit of claim 5 wherein said source of substantially sinusoidal motor drive voltages for application to the driver circuits comprises a circuit for generating a waveform having a value of zero for 120° C., followed by a waveform having a shape of an "up hook" for 120° C., followed by a waveform having a shape of a "down hook" for 120° C.

10. The circuit of claim 9 wherein said circuit for generating a waveform comprises a resistor having multiple taps to which connections may be sequentially established to produce voltage values for forming said zero, "up hook", and "down hook" waveforms.

11. A disk drive product of the type having a dc brushless, Hall-less, three phase motor for rotating a data containing media, comprising:

three driver circuits for providing driving signals to drive selected sets of coils in the motor;

a source of substantially sinusoidal motor drive voltages for application to the driver circuits;

a circuit for detecting zero crossings of current flowing in the driver circuits as a result of the sinusoidal motor drive voltages;

a circuit to change the phase of the sinusoidal motor drive voltages with respect to the current flowing in the driver circuits to align zero crossings of the current flowing in the driver circuits with zero crossings of the sinusoidal motor drive voltages.

12. The circuit of claim 11 further wherein said driver circuits each comprise a pair of FETs connected together at a driving signal node and in series between a voltage supply and a reference potential, and wherein said circuit for detecting zero crossings of current flowing in the driver circuits as a result of the sinusoidal motor drive voltages comprises comparators connected across each of said FETs.

13. The circuit of claim 11 further comprising a circuit for pulse-width modulating the substantially sinusoidal motor drive voltages prior to application thereof to said driver circuits.

14. The circuit of claim 11 wherein said source of substantially sinusoidal motor drive voltages for application to the driver circuits comprises a circuit for generating a waveform having a value of zero for 120° C., followed by a waveform having a shape of an "up hook" for 120° C., followed by a waveform having a shape of a "down hook" for 120° C.

15. The circuit of claim 14, wherein said circuit for generating a waveform comprises a resistor having multiple taps to which connections may be sequentially established to produce voltage values for forming said zero, "up hook" , and "down hook" waveforms.

16. The circuit of claim 11 wherein said data containing media is a magnetic media of a hard disk drive.

* * * * *